(12) United States Patent
van Essen

(10) Patent No.: US 11,193,555 B2
(45) Date of Patent: Dec. 7, 2021

(54) CLAMPED CONNECTION FOR THE CONTINUOUS CONNECTION OF A CONVEYOR BELT

(71) Applicant: BEUMER Group GmbH & Co. KG, Beckum (DE)

(72) Inventor: Josef van Essen, Sendenhorst (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 16/992,524

(22) Filed: Aug. 13, 2020

(65) Prior Publication Data

US 2021/0048090 A1 Feb. 18, 2021

(30) Foreign Application Priority Data

Aug. 16, 2019 (EP) .................................... 19192048

(51) Int. Cl.
*F16G 3/06* (2006.01)
*F16G 11/00* (2006.01)

(52) U.S. Cl.
CPC .............. *F16G 11/00* (2013.01); *F16G 3/06* (2013.01)

(58) Field of Classification Search
CPC ... Y10T 24/168; Y10T 24/16; Y10T 24/1692; Y10T 24/166; F16G 11/00; F16G 3/00; F16G 3/06; F16G 3/08
See application file for complete search history.

(56) References Cited

U.S. PATENT DOCUMENTS

| | | | | |
|---|---|---|---|---|
| 1,818,297 A | * | 8/1931 | Bowlus ..................... | F16G 3/06 24/37 |
| 2,059,401 A | * | 11/1936 | Boggs ....................... | F16G 3/06 24/37 |
| 4,489,827 A | * | 12/1984 | Anderson ................. | F16G 3/06 198/844.2 |
| 4,540,389 A | * | 9/1985 | Ramsey .................... | F16G 3/06 24/37 |
| 4,757,576 A | * | 7/1988 | Jaubert .................... | F16G 3/06 24/31 R |
| 2015/0226286 A1 | * | 8/2015 | Phillips .................... | F16G 3/06 24/38 |

FOREIGN PATENT DOCUMENTS

DE 29621572 3/1997

* cited by examiner

*Primary Examiner* — Robert Sandy
*Assistant Examiner* — Michael S Lee
(74) *Attorney, Agent, or Firm* — Ganz Pollard, LLC

(57) ABSTRACT

Clamped connection for connecting two end sections of a conveyor belt which is to be set up as continuous and which has embedded tension members, with two moulded pieces that can be braced against each other, each having a contact surface for an end section of the conveyor belt, between which is arranged a spacer, and in each case an end section can be clamped in a clamping area between the spacer and a contact surface of a moulded piece, and wherein ends of the tension members can be secured in a cast block formed with a casting material and which is braced against the moulded pieces, characterised in that for each end section of the conveyor belt, its own separate cast block is formed, a conveyor belt connected to it, and a method of connecting a conveyor belt.

17 Claims, 2 Drawing Sheets

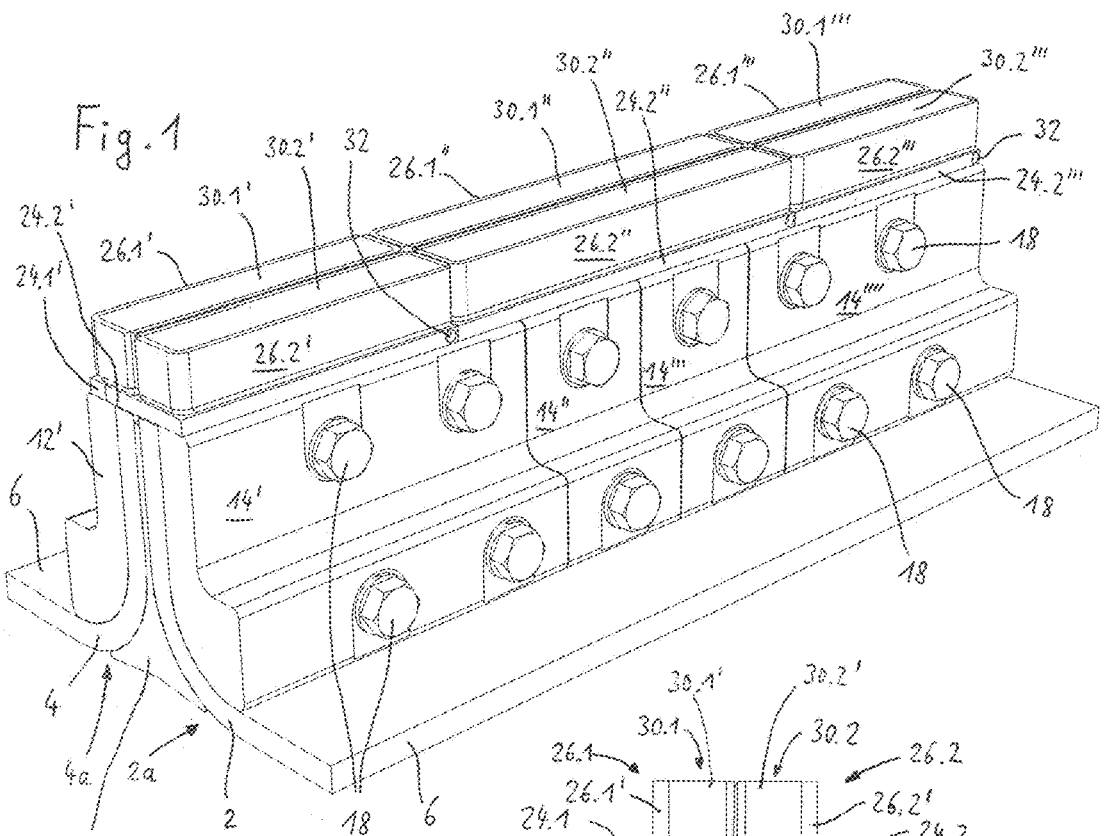
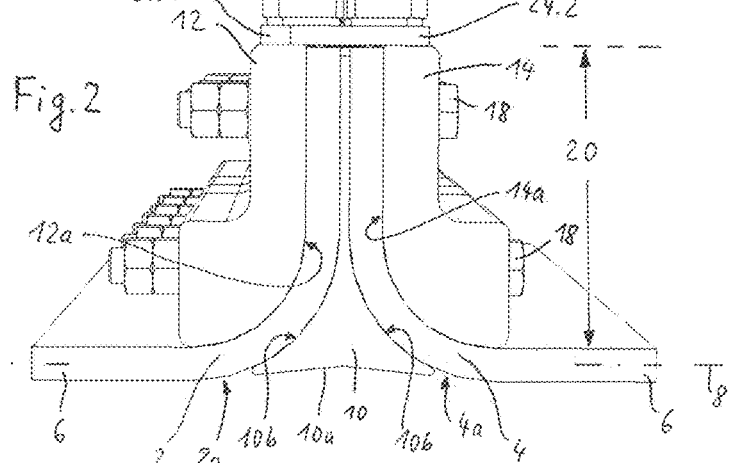
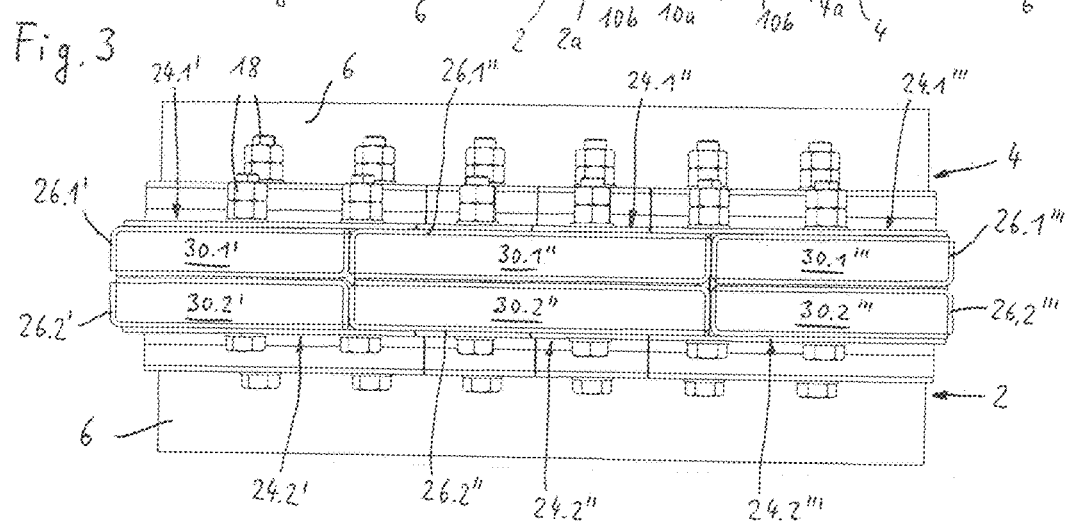

CLAMPED CONNECTION FOR THE CONTINUOUS CONNECTION OF A CONVEYOR BELT

BACKGROUND

The invention concerns a clamped connection for joining two end sections of a conveyor belt which is to be set up to be continuous and which has embedded tension members, in particular for belt-type bucket elevators, with two moulded pieces which can be braced against one another and which in each case have a contact surface for an end section of the conveyor belt, arranged between which is a spacer, and in each case an end section can be clamped in a clamping area between the spacer and a contact surface of a moulded pieces, and wherein ends of the tension members can be secured in a cast block which is formed with a casting material and which is braced against the moulded pieces. Such a clamped connection is known for example from DE 296 21 572 U1.

Such a clamped connection and a conveyor belt that has thus been rendered continuous have proved their worth in practice, but present the personnel who are connecting the belt with the task of carrying out the casting of the exposed ends of the tension members of the conveyor belt in a state in which the conveyor belt is deployed in the conveyor equipment, which is often difficult on account of the limited space. The same applies for connecting the exposed ends of the tension members by splicing or binding, which likewise has to take place in the installed state.

The task of the invention is to further develop a clamped connection of this type such that the continuous connection of the end sections of the conveyor belt is simplified.

SUMMARY

According to this invention, this object is achieved in the first instance by a clamped connection of this type, for joining two end sections of a conveyor belt which is to be set up as continuous and which has embedded tension members, which is characterised in that its own separate cast block is formed for each end section of the conveyor belt. The invention is based on the insight that in order to produce a stable and durable connection, exhibiting tensile strength, of the end sections of a conveyor belt, in particular for belt-type bucket elevators, it is not particularly significant that the ends of the tension members of an end section are cast with the ends of the tension members of the other end section and possibly additionally joined to one another by means of splicing or binding and/or by means of rope clamping, but that it is completely sufficient if in each case the ends of the tension members of just one and the same end section of the conveyor belt are cast in a cast block and possibly additionally connected to one another by means of splicing or binding and/or by means of rope clamping. Through the formation of its own separate cast block for each end section of the conveyor belt, the great advantage is achieved that the whole casting process, including the joining of the ends of the tension members, can take place in the workshop, wherein on the equipment itself, only the end sections need to be joined, by means of moulded pieces that are to be braced.

The contact surfaces can be rounded, for example with a quarter-circle cross section.

Expediently, it is envisaged that each cast block is formed in a casting box, which can for example be of steel, and which is arranged around the exposed ends of the tension members.

For preference, each cast block is formed of a casting material that has a high friction coefficient with steel or with the material of which the tension members consist. The casting material can be a metal, synthetic or composite material, possibly enriched with reinforcing fibres.

It can be envisaged that arranged in each case between a cast block or a casting box and a moulded piece there is a support element, for example a support plate, which can be welded to the respective casting box. The support element can comprise several parts, in particular two sections or halves, which can be screwed to one another.

Expediently, the moulded pieces are equipped with screw connections that penetrate through them, and can be braced by means of them. Here, the moulded pieces can be provided with penetrating expansion screws in order to provide an expansion reserve for the eventuality that the braced end sections of the conveyor belt give slightly on account of their elasticity.

Each cast block or casting box can be divided into several individual cast block sections or casting box sections, for example two, three, four or more, as seen in the transverse direction of the conveyor belt. Also, each moulded piece can be divided into several individual moulded piece sections, for example two, three, four or more, as seen in the transverse direction of the conveyor belt. Although each individual moulded piece section could be assigned to an individual cast block section or casting box section and its width could correspond to that of an individual cast block section or casting box section, expediently an alternating overlapping of moulded piece sections and cast block sections or casting box sections is envisaged, wherein the individual cast block sections or casting box sections have a width that is smaller or larger than a width of the individual moulded piece sections, so that there is at least one moulded piece section on which two cast block sections or casting box sections are supported at least partially, and to a certain extent are bridged.

Regardless of whether several cast block sections per end section of the conveyor belt are envisaged, or only an individual cast block or casting box, it can be envisaged that a moulded piece or both moulded pieces are divided into several moulded piece sections, as seen in the transverse direction of the conveyor belt.

The object of the invention is furthermore achieved by a conveyor belt with embedded tension members and two end sections that are connected by means of a clamped connection according to this invention, and the conveyor belt is thereby set up to be continuous, wherein the end sections are led out of a plane of travel of the conveyor belt and are held clamped between the moulded pieces and the spacer, wherein the conveyor belt is characterised by the fact that at both end sections of the conveyor belt, the tension members are exposed from the surrounding belt material and in each case are secured in their own separate cast blocks that are filled with casting material. Each cast block can be arranged in a casting box, and the tension members in each case of one end section of the conveyor belt can be joined to one another within the cast block assigned to this end section, for example through splicing, binding and/or by means of rope clamping.

It can be envisaged that one or each cast block is divided into several individual cast block sections, for example two, three, four or more, as seen in the transverse direction of the conveyor belt, which can be respectively arranged in individual casting box sections.

The object of the invention is furthermore achieved by a method for connecting two end sections of a conveyor belt which is to be set up as continuous and which is equipped with embedded tension members, wherein the end sections are led out of a connection plane of the conveyor belt and two moulded pieces equipped with rounded contact surfaces are placed on top and braced, wherein a spacer is arranged between the moulded pieces and the end sections are respectively clamped in a clamping area between the spacer and a contact surface of a moulded piece, and wherein ends of the tension members are exposed from surrounding belt material after emerging from the clamping area and are secured by casting with a casting material, wherein a cast block is formed that rests against the moulded pieces, wherein according to the invention each end section of the conveyor belt is cast separately and its own separate cast block is formed for each end section of the conveyor belt.

It can be envisaged that the casting material is poured into a casting box that is arranged around the ends of the tension members.

Expediently, the ends of the tension members respectively of one end section of the conveyor belt are respectively joined to one another before casting, for example through splicing, binding and/or by means of rope clamping.

For preference, it is envisaged that the casting of the ends of the tension members and the formation of the cast blocks takes place before the end sections of the conveyor belt are connected to one another by means of the moulded pieces, to form a continuous conveyor belt.

Further advantages and features of the invention follow from the following description of an embodiment, with reference being made to a drawing, in which

BRIEF DESCRIPTION OF DRAWINGS

FIG. 1 shows a perspective view of a clamped connection for joining two end sections of a conveyor belt, FIG. 2 shows a side view of the clamped connection according to FIG. 1, FIG. 3 shows a top view onto the clamped connection according to FIGS. 1 and 2.

DETAILED DESCRIPTION

Figure 4:
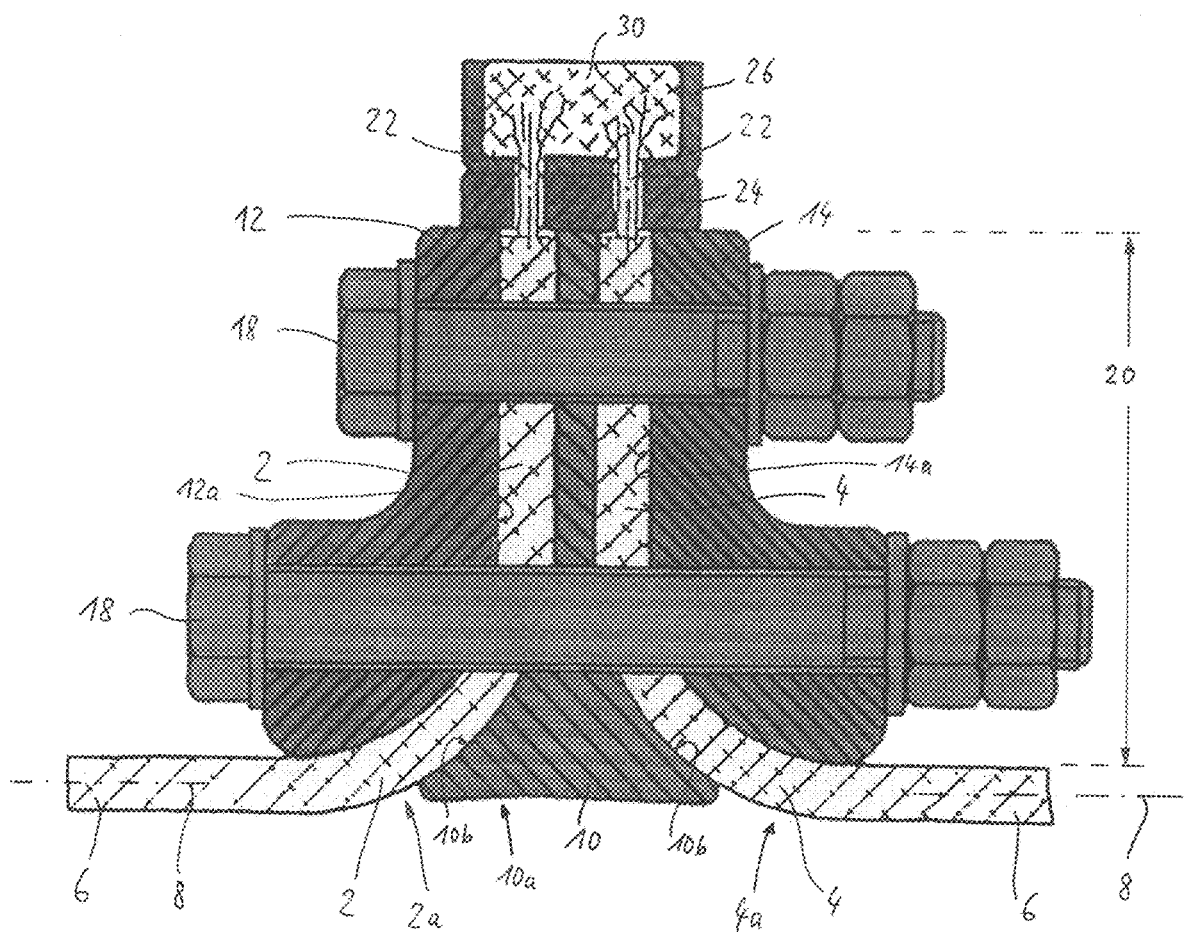
FIG. 4 shows a clamped connection according to the prior art.

In the case of the clamped connection according to the prior art as shown in FIG. 4, two end sections 2, 4 of a conveyor belt 6 that is to be set up as continuous, in particular for a belt-type bucket elevator, are led essentially at right angles in a rounded deflection area 2a, 4a out of a plane of travel 8 of the conveyor belt 6. Following on from the deflection area 2a, 4a, the end sections 2, 4 run flat.

Inserted between the end sections 2, 4 is a spacer 10, rounded on both sides, that guides the two end sections as they are angled.

In the plane of travel 8 of the conveyor belt 6, the spacer 10 has a concave contact surface 10a, in order to adapt to a curvature of deflection rollers or drive rollers of the conveyor belt.

Moulded pieces 12, 14 arranged lying opposite one another in relation to the end sections 2, 4 of the conveyor belt 6 have rounded contact surfaces 12a, 14a, with which the moulded pieces 12, 14 rest against one side of the conveyor belt 6. Correspondingly shaped rounded contact surfaces 10b of the spacer 10 rest against an opposite side of the conveyor belt 6, so that the end sections 2, 4 are accommodated in a form-fitting manner between the rounded contact surfaces of the moulded pieces 12, 14 and of the spacer 10.

The contact surfaces 12a, 14a and 10b can be curved in the shape of a quarter-circular cross section in the deflection area adjacent to the plane of travel 8, and following on from that they have a flat area in which the end sections 2, 4 of the conveyor belt 6 run flat and perpendicular to the plane of travel 8.

The end sections 2, 4 of the conveyor belt 6 are held clamped in a clamping area 20 between the contact surfaces 10b of the spacer 10 and the contact surfaces 12a, 14a of the moulded pieces 12, 14, by means of a suitable bracing of the moulded pieces 12, 14, wherein the bracing effect is achieved here by screw connections 18. In particular, two rows of screw connections 18 lying over one another are envisaged, which respectively comprise several screws arranged next to one another, as seen in the transverse direction of the conveyor belt 6. High-strength screws or bolts, for example expansion screws, can be envisaged, which penetrate the moulded pieces, the spacer and the end sections of the conveyor belt and which can be tightened with a suitable prestress.

The conveyor belt 6 is equipped with embedded tension members 22, which for example can be formed by steel ropes, which are arranged in the longitudinal direction of the belt, wherein the tension members 22, after emerging from the clamping area 20, are freed from the surrounding belt material and are thus exposed. The exposed ends of the tension members 22 are accommodated in a casting box 26, wherein a support plate 24 is arranged between the moulded pieces 12, 14 and the casting box 26.

The exposed ends of the tension members 22 of both end sections 2, 4 of the conveyor belt are cast with a casting material, wherein the casting material forms a cast block 30 that rests against the moulded pieces 12, 14. The casting material is poured into the casting box 26, so that the cast block 30 is formed in one piece with it and the exposed end sections of the tension members 22. The spacer plate 24 is welded to the casting box 26.

The ends of the tension members 22 are generally joined to one another, whether through splicing, binding and/or through rope clamping.

FIGS. 1 to 3 elucidate a clamped connection according to the invention. Similarly to the prior art, end sections 2, 4 of a conveyor belt 6 are held clamped between moulded pieces 12, 14 and a spacer 10, wherein two rows of screw connections 18 are envisaged which penetrate through the moulded pieces, the spacer and the end sections of the conveyor belt. The spacer 10 has a slightly concave shaped or curved contact surface 10a, which serves to rest against drive rollers or deflection rollers of the conveyor belt, as well as contact surfaces 10b which in terms of cross section are curved approximately quarter-circular and are subsequently flat. The moulded pieces 12, 14 have corresponding contact surfaces 12a, 14a, in terms of cross section initially curved approximately quarter-circular and subsequently flat, wherein the end sections 2, 4 of the conveyor belt 6 are respectively held clamped in a clamping area 20 between the contact surfaces 10b of the spacer and the contact surfaces 12a and 14a of the moulded pieces.

Following on from the clamping area 20, the embedded tension members of the conveyor belt 6 are freed from the surrounding belt material and thus exposed, and in contrast to the prior art, they are not secured in a single cast block, but each in a separate cast block 30.1, 30.2, wherein one cast block is envisaged per end section of the conveyor belt. The embedded tension members of the one end section 2 of the conveyor belt are secured in the cast block 30.1, which is accommodated in a casting box 26.1, and the tension members of the other end section 4 of the conveyor belt 6 are secured in the cast block 30.2, which is accommodated in a casting box 26.2. On account of this separate design of each end section 2, 4 of the conveyor belt 6, it is possible to complete the casting of the ends of the tension members at each end section before the thus prepared end sections of the conveyor belt are finally joined to one another with the aid of the moulded pieces and the spacer.

In a similar way to the prior art, a support plate 24 is provided between the casting boxes and the moulded pieces, wherein however the support plate is formed from two sections or halves 24.1, 24.2, which are respectively pushed on from the side and can be secured on one another by means of a fixing screw 32. Through this separate design of cast blocks, casting boxes and support plate, the conveyor belt can not only be joined to become continuous more simply in the manner described, but the clamped connection can be released again, for example for maintenance or repair purposes, without the destruction of a cast block.

FIGS. 1 to 3 show another difference from the prior art, which consists in the fact that each individual cast block 30.1, 30.2, casting box 26.1, 26.2 and the support plate 24 is divided into several sections, as seen in the transverse direction of the conveyor belt 6: in the example shown here, into three adjacently arranged cast block sections 30.1', 30.1", 30.1''' and 30.2', 30.2" and 30.2''', as well as casting box sections 26.1', 26.1", 26.1''' and 26.2', 26.2" and 26.2'''.

Furthermore, the moulded pieces 12, 14 too are divided into several sections, as seen in the transverse direction of the conveyor belt 6, in this case into four moulded piece sections 12' to 12'''' and 14' to 14". The support plate 24.1, 24.2 too is divided into the sections 24.1', 24.1", 24.1''' and 24.2', 24.2", 24.2''' as seen in the transverse direction of the belt, the width of which corresponds to that of the casting box sections.

The respective widths (the dimension as seen in the transverse direction of the conveyor belt 6) of the individual casting box sections, support plate sections and moulded piece sections are preferably different, in order to achieve an overlap between casting boxes and support plates on the one hand and the moulded pieces on the other hand, as shown in FIG. 1.

The invention claimed is:

1. A clamped connection for joining two end sections of a conveyor belt which is to be set up as continuous and which has embedded tension members, the clamped connection comprising:
    two moulded pieces which can be braced against one another and which in each case have a contact surface for a pair of end sections of the conveyor belt;
    a spacer arranged between the two moulded pieces, and in each case an end section is clamped in a clamping area between the spacer and a contact surface of a moulded piece; and
    a plurality of cast blocks formed with a casting material and wherein ends of the tension members are secured in a cast block, which is braced against the moulded pieces, wherein for each end section of the conveyor belt, its own separate cast block is formed for securing its respective tension members.

2. The clamped connection according to claim 1, further comprising a plurality of casting boxes, and wherein each cast block is arranged in a separate casting box that is arranged around the ends of the tension members.

3. The clamped connection according to claim 2, further comprising one more support elements, and wherein in each case a support element is arranged between a cast block or casting box and a moulded piece.

4. The clamped connection according to claim 2, wherein each casting box, as seen in the transverse direction of the conveyor belt, is divided into several casting box sections.

5. The clamped connection according to claim 3, wherein each support plate section, as seen in the transverse direction of the conveyor belt, is divided into several support plate sections.

6. The clamped connection according to claim 1, characterised in that the moulded pieces further comprise screw connections that penetrate through them and by means of which they can be braced.

7. The clamped connection according to claim 1, wherein each cast block, as seen in the transverse direction of the conveyor belt, is divided into several individual cast block sections.

8. The clamped connection according to claim 7, wherein the individual cast block sections are of a width that is smaller or larger than a width of an individual moulded piece section, in order to achieve an overlap.

9. The clamped connection according to claim 1, wherein each moulded piece, as seen in the transverse direction of the conveyor belt, is divided into several moulded piece sections.

10. The clamped connection according to claim 1, wherein the moulded pieces have rounded contact surfaces.

11. A conveyor belt, in particular for belt-type bucket elevators, with embedded tension members and two end sections, which are connected by means of a clamped connection, the clamped connection comprising:
    two moulded pieces which can be braced against one another and which in each case have a contact surface for a pair of end sections of the conveyor belt;
    a spacer arranged between the two moulded pieces, and in each case an end section is clamped in a clamping area between the spacer and a contact surface of a moulded piece;
    a plurality of cast blocks formed with a casting material and wherein ends of the tension members are secured in a cast block, which is braced against the moulded pieces, wherein for each end section of the conveyor belt, its own separate cast block is formed for securing its respective tension members;
    wherein thereby the conveyor belt is set up to be continuous, wherein the end sections are led out of a plane of travel of the conveyor belt and are held clamped between the moulded pieces and the spacer, wherein at both end sections of the conveyor belt, the tension members are exposed from the surrounding belt material and in each case are secured in their own separate cast blocks that are filled with the casting material.

12. The conveyor belt according to claim 11, wherein the tension members of each end section of the conveyor belt are joined to one another within the cast block that is assigned to the end section.

13. The conveyor belt according to claim 11, wherein the tension members of each end section are joined to one another by splicing, binding and/or by means of rope clamping.

14. A method for connecting two end sections of a conveyor belt which is to be set up as continuous and which is equipped with embedded tension members, comprising the steps of:
leading the end sections out of a plane of travel of the conveyor belt; and
arranging the end sections between two moulded pieces equipped with contact surfaces, with a spacer arranged between the moulded pieces, and the end sections are respectively clamped in a clamping area between the spacer and a contact surface of a moulded piece, and wherein ends of the tension members are exposed from the surrounding belt material after emerging from the clamping area and are secured by cast blocks formed of a casting material, wherein each cast block rests against a moulded pieces, wherein each end section of the conveyor belt is secured in its own separate cast block.

15. The method according to claim 14, wherein the casting material formed is formed in a casting box that is arranged around the ends of the tension members.

16. The method according to claim 14, wherein the ends of the tension members of one end section of the conveyor belt are respectively joined to one another before casting of the cast blocks.

17. The method according to claim 14, wherein the casting of the ends of the tension members and the formation of the cast blocks takes place before the end sections of the conveyor belt are connected to one another by means of the moulded pieces to form a continuous conveyor belt.

* * * * *